(12) United States Patent
Mikulás et al.

(10) Patent No.: US 12,209,637 B2
(45) Date of Patent: Jan. 28, 2025

(54) GEAR ARRANGEMENT, POWER TAKE-OFF MODULE AND VEHICLE GEARBOX

(71) Applicant: ZF Friedrichshafen AG, Friedrichshafen (DE)

(72) Inventors: László Mikulás, Noszvaj (HU); Pál Csaba Németh, Eger (HU)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/466,315

(22) Filed: Sep. 13, 2023

(65) Prior Publication Data
US 2024/0093760 A1    Mar. 21, 2024

(30) Foreign Application Priority Data
Sep. 16, 2022 (DE) .................... 10 2022 209 737.8

(51) Int. Cl.
*F16H 1/24* (2006.01)
*B60K 17/28* (2006.01)
*F16H 1/20* (2006.01)

(52) U.S. Cl.
CPC ............... *F16H 1/24* (2013.01); *B60K 17/28* (2013.01); *F16H 1/20* (2013.01)

(58) Field of Classification Search
CPC ... F16H 1/24; F16H 1/20; F16H 57/12; F16H 2057/127; B60K 17/28
See application file for complete search history.

(56) References Cited

U.S. PATENT DOCUMENTS

| 2,496,857 | A | * | 2/1950 | Cronstedt | ............... F16H 37/00 74/665 K |
| 3,590,652 | A | * | 7/1971 | Strang | ................... F16C 35/073 403/370 |
| 4,147,071 | A | * | 4/1979 | Scribner | ................. F16H 57/12 74/421 A |

(Continued)

FOREIGN PATENT DOCUMENTS

| DE | 196 24 083 A1 | 1/1998 |
| DE | 10 2019 133 150 A1 | 6/2021 |

OTHER PUBLICATIONS

German Patent Office, Search Report issued in German patent application No. 10 2022 209 737.8 (Mar. 3, 2023), Portions in English language have been considered.

*Primary Examiner* — Frank B Vanaman
(74) *Attorney, Agent, or Firm* — Finch & Maloney PLLC

(57) ABSTRACT

A gearwheel arrangement (1) for the quieter transmission of a mechanical rotary power, the gearwheel arrangement (1) having a first intermediate gearwheel (2) and a second intermediate gearwheel (3), where the first intermediate gearwheel (2) and the second intermediate gearwheel (3) can rotate together about a common rotation axis (10), where at least one of the intermediate gearwheels (2, 3) has helical teeth (14, 15), the intermediate gearwheels (2, 3) can move axially relative to one another to a limited extent, and at least one of the intermediate gearwheels (2, 3) is acted upon axially by a spring force. Also disclosed is an auxiliary power take-off module for a vehicle transmission having an input gearwheel (12) and a gearwheel arrangement (1) of the above type, and a vehicle transmission with an auxiliary output gearwheel (13) and a gearwheel arrangement (1) of the said type.

14 Claims, 2 Drawing Sheets

(56) References Cited

U.S. PATENT DOCUMENTS

| | | | | |
|---|---|---|---|---|
| 4,610,175 | A | * | 9/1986 | Weis ................ B60K 17/28 |
| | | | | 74/606 R |
| 4,683,995 | A | * | 8/1987 | Periou ............... E05F 11/505 |
| | | | | 192/223.4 |
| 5,228,355 | A | * | 7/1993 | Smith ............... F16H 57/0493 |
| | | | | 184/6.12 |
| 2008/0148883 | A1 | | 6/2008 | Prampolini |
| 2017/0314665 | A1 | * | 11/2017 | Garcia ............... B60K 25/02 |
| 2018/0017148 | A1 | * | 1/2018 | Mehlis ............... B60K 1/00 |
| 2021/0102615 | A1 | | 4/2021 | Campbell |

\* cited by examiner

GEAR ARRANGEMENT, POWER TAKE-OFF MODULE AND VEHICLE GEARBOX

RELATED APPLICATIONS

This application claims the benefit of and right of priority under 35 U.S.C. § 119 to German Patent Application no. 10 2022 209 737.8, filed on 16 Sep. 2022, the contents of which are incorporated herein by reference in its entirety.

FIELD OF THE DISCLOSURE

The invention relates to a gearwheel arrangement for the quieter transmission of a mechanical rotary power, the said gearwheel arrangement comprising a first intermediate gearwheel and a second intermediate gearwheel, wherein the first intermediate gearwheel and the second intermediate gearwheel together can rotate about a common rotation axis. In addition, the invention relates to an auxiliary power take-off module for a vehicle transmission, the auxiliary power take-off module comprising an input gearwheel. Furthermore, the invention relates to a vehicle transmission with an auxiliary output gearwheel.

BACKGROUND

From the document US 2008/0148883 A1 an auxiliary power take-off is known, in particular for industrial vehicles, in which a first intermediate gearwheel meshes with an external drive input gearwheel and a second, driven gearwheel can be connected to a drive output shaft of the auxiliary power take-off, wherein the auxiliary power take-off comprises gearwheels with conically directed teeth whose relative position depends on an action of elastic means which act upon at least one of the gearwheels in the direction of a rotation axis, and on a torque transmitted between the gearwheels.

From the document US 2021/0102615 A1 a transmission system for an auxiliary power take-off is known, which comprises an auxiliary power take-off housing with a first wall positioned opposite a second wall a distance away from it, a shaft extending between the first wall and the second wall, a shaft sleeve supported on the said shaft, and an input gearwheel supported on the said shaft sleeve, wherein the shaft sleeve can move along the shaft between the first wall and the second wall.

SUMMARY

A purpose of the present invention is to improve the structure and/or function of a gearwheel arrangement of the type mentioned to begin with. In addition, a purpose of the present invention is to improve the structure and/or function of an auxiliary power take-off module. Furthermore, the purpose of the present invention is to improve the structure and/or function of a vehicle transmission of the type mentioned at the start.

The objective is achieved with a gearwheel arrangement having the characteristics disclosed herein. In addition, the objective is achieved with an auxiliary power take-off module having the characteristics disclosed herein. Furthermore, the objective is achieved with a vehicle transmission having the characteristics disclosed herein. Advantageous embodiments and/or further developments will be apparent in light of the present disclosure.

The gearwheel arrangement can be designed to reduce the noise emitted during the operation of a gearwheel transmission. The gearwheel arrangement can be designed to reduce clattering and/or rattling noise. The gearwheel arrangement can be self-adjusting. When a mechanical rotary power is transmitted, a torque and/or a rotation speed may be present. The rotary power, the torque and/or the rotation speed may not be constant. The rotary power, the torque and/or the rotation speed may fluctuate periodically.

The gearwheel arrangement can be designed, together with further gearwheels, to form a first gearwheel pair and a second gearwheel pair. The first intermediate gearwheel can be designed to form a first gearwheel pair with a first gearwheel. The second intermediate gearwheel can be designed to form a second gearwheel pair with a second gearwheel. The first and second intermediate gearwheels can have the same number of teeth. The first and second intermediate gearwheels can have different numbers of teeth. The first intermediate gearwheel can have a smaller number of teeth than the second intermediate gearwheel. The first intermediate gearwheel can have a smaller diameter than the second intermediate gearwheel. The first and second intermediate gearwheels can be arranged coaxially with one another. The first and second intermediate gearwheels can be arranged parallel with one another and a distance apart.

The first intermediate gearwheel can have helical teeth. The second intermediate gearwheel can have helical teeth. The first and/or the second intermediate gearwheel(s) can have helical teeth such that when a mechanical rotary power is transmitted, an axial force component is induced. The first and the second intermediate gearwheels can have helical teeth with the same pitch. The first and the second intermediate gearwheels can have helical teeth with different pitches. The first and/or the second intermediate gearwheel can be a spur gear with helical teeth. The helical teeth can 'rise' to the right or to the left. The first and/or the second intermediate gearwheel can be a spur gear with helical teeth. The teeth of the first intermediate gearwheel and/or the teeth of the second intermediate gearwheel can have tooth axes and can be arranged with their tooth axes skewed relative to the rotation axis. The teeth of the first intermediate gearwheel and/or the teeth of the second intermediate gearwheel can be skewed relative to the rotation axis by the width of an intermediate gearwheel. The first and/or the second intermediate gearwheel(s) can have conical teeth. The teeth of the first intermediate gearwheel and/or the teeth of the second intermediate gearwheel can be arranged with their tooth axes oblique relative to the rotation axis. Tooth axes of the first and/or the second intermediate gearwheel(s) can intersect the rotation axis.

Relative to one another, the intermediate gearwheels can move between a first end position and a second end position. A separation between the intermediate gearwheels can be adjustable. A separation between the intermediate gearwheels can be adjustable between a minimum value and a maximum value. The first intermediate gearwheel and/or the second intermediate gearwheel can be acted upon by axial spring force. The spring force can vary progressively, linearly, and/or regressively over a spring travel distance, at least in sections. The intermediate gearwheels can be acted upon by spring force relative to one another. The intermediate gearwheels can be acted upon by spring force in opposite directions. The intermediate gearwheels can be acted upon by the same spring force. The intermediate gearwheels can be acted upon by equal spring forces. The intermediate gearwheels can be acted upon by unequal spring forces. The intermediate gearwheels can be acted upon by spring force in the same direction.

The gearwheel arrangement can comprise a shaft. The shaft can be in the form of a hollow shaft. The shaft can be ring-shaped. The shaft can be a solid shaft. The shaft can be mounted rotatably. The gearwheel arrangement can comprise shaft bearings. There can be two shaft bearings. The bearings can be in the form of roller bearings. The bearings can be in the form of cylindrical roller bearings. The bearings can be in the form of conical roller bearings. The bearings can be in the form of ball bearings. The bearings can be in the form of angular-contact ball bearings.

The gearwheel arrangement can have a base. The base can be designed as a support. The base can be of plate-shaped or of angular design. The base can comprise a plate section, supporting sections and/or an axle. The supporting section can be arranged on the plate section. The axle can be arranged on the supporting sections. The shaft can be mounted on the base, in particular on the axle. The shaft bearings can act between the base, in particular the axle, and the shaft.

The first intermediate gearwheel can be arranged axially fixed on the shaft. The first intermediate gearwheel can be connected to the shaft rotationally fixed and in an axially fixed position. The first intermediate gearwheel and the shaft can be made integrally connected with one another. The first intermediate gearwheel and the shaft can be firmly connected with positive interlock, or by friction force, or by bonding.

The second intermediate gearwheel can be arranged on the shaft in such manner that it can be displaced axially within limits. The second intermediate gearwheel can be connected to the shaft rotationally fixed and axially displaceable. The second intermediate gearwheel can have a central bore for fitting it onto the shaft. The second intermediate gearwheel and the shaft can first be made separately from one another and thereafter connected to one another. The second intermediate gearwheel and the shaft can be connected to one another by means of an axially displaceable shaft-hub connection. The second intermediate gearwheel and the shaft can be joined to one another by means of a splined shaft connection. The displacement of the shaft-hub connection can be restricted by positive interlock. The displacement of the shaft-hub connection can be restricted in a releasable manner. The second intermediate gearwheel and the shaft can be connected with one another so that they can be assembled and/or taken apart.

The gearwheel arrangement can comprise a securing element that acts between the shaft and the second intermediate gearwheel. The securing element can be designed such that it connects the second intermediate gearwheel and the shaft to one another so that they can be assembled together and/or taken apart. The securing element can be in the form of a locking ring. The securing element can be in the form of an internal locking ring for fitting into a bore of the second intermediate gearwheel. The second intermediate gearwheel can have a receiving groove for the locking ring. The width of the receiving groove of the second intermediate gearwheel can correspond at least approximately to the width of the locking ring. The shaft can have a receiving groove for the locking ring. The width of the shaft's receiving groove can correspond to a multiple of the width of the locking ring. The width of the said receiving groove can correspond to three to four times the width of the locking ring.

The gearwheel arrangement can comprise a spring device that acts between the intermediate gearwheels. The spring device can rest against the first intermediate gearwheel on one side and against the second intermediate gearwheel on the other side. The spring device can comprise or be in the form of a cup spring. The cup spring can have a radially inner edge and a radially outer edge. The cup spring can rest against the first intermediate gearwheel with its radially inner edge and against the second intermediate gearwheel with its radially outer edge.

The auxiliary drive can also be called a power take-off or PTO and be designed to provide a mechanical power source at an auxiliary output of a vehicle transmission. The auxiliary drive can be a clutch-dependent auxiliary drive module or a motor-dependent auxiliary drive module. The input gearwheel and the first intermediate gearwheel can be paired with one another. The auxiliary drive module can have an auxiliary drive module housing. The input gearwheel and the gearwheel arrangement can be accommodated at least in part in the auxiliary drive module housing. The auxiliary drive module housing can be designed to be connected to a vehicle transmission.

The vehicle transmission can be designed to be arranged in a drivetrain of a vehicle. The vehicle transmission can be designed to be arranged between a drive machine, in particular an internal combustion engine, and at least one drivable vehicle wheel. The vehicle transmission can be designed as a change-speed transmission. The vehicle transmission can comprise an input, a main output and at least one auxiliary output. The main output can also be called the main drive output. The auxiliary output can also be called the auxiliary drive output. The auxiliary output can comprise the auxiliary output gearwheel or be formed by the auxiliary output gearwheel. The auxiliary output gearwheel and the second intermediate gearwheel can be paired with one another. The vehicle transmission can have a transmission housing. The auxiliary output gearwheel and the gearwheel arrangement can be accommodated in the transmission housing, at least in part.

The vehicle can be a motor vehicle, in particular a truck, a utility vehicle, a towing machine, a tractor, a building machine, a fire engine, a civil protection vehicle, and/or a communal vehicle. The vehicle can comprise a drivetrain. The vehicle can have a drive engine. The drive engine can be in the form of an internal combustion engine. The vehicle can have at least one drivable vehicle wheel.

In summary and expressed in other words, thanks to the invention, among other things transmission rattle is reduced by axially adjusted bevel gearwheels for auxiliary power take-offs. For this a composite transmission can be provided, in which two helically toothed gearwheels are present, and in addition an adapter shaft that carries the gearwheel and a further gearwheel which is mounted on the adapter shaft in such manner that a composite transmission concept is realized.

The fitted gearwheel can mesh with the output gearwheel of a transmission, while the gearwheel on the adapter shaft can engage with the input gearwheel of a PTO shaft. The two helically toothed gearwheels can have a small cone angle at the head diameter so as to ensure correct meshing during self-adjustment. In the composite transmission this adjustment can take place in the axial direction between the two helical spur gears on the adapter shaft, by means of a cup spring. The cup spring can adjust the tooth clearance, in that it moves the gearwheels relative to one another in the axial direction and its spring force can hold the gearwheels in the correct position at all times when they inter-engage and when they transmit the load or torque.

The fitted helical spur gear can be held on the adapter shaft by a locking ring to prevent loosening and self-detachment from the shaft, but it can also be moved in the axial direction for correct adjustment.

Thanks to the invention, efficiency, useful life, and/or comfort is/are increased. Expenditure, such as assembly effort and/or costs are reduced. There is no need for pre-assembly or post-assembly adjustment. The transmission range can be increased.

BRIEF DESCRIPTION OF THE DRAWINGS

Below, example embodiments of the invention are described in greater detail with reference to figures, which show schematically and as examples.

DETAILED DESCRIPTION

Figure 1:
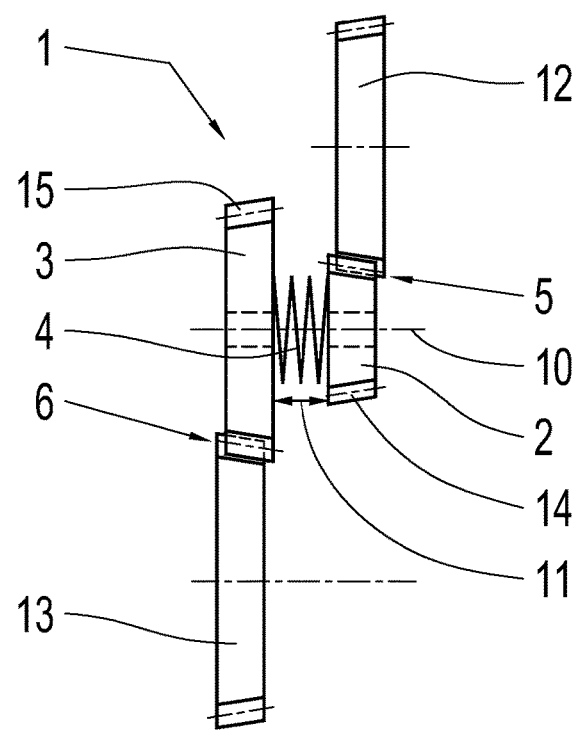
FIG. 1: A gearwheel arrangement for the quieter transmission of a mechanical rotary power, the arrangement comprising two intermediate gearwheels and a spring device, and two gearwheel pairs formed with the help of the gearwheel arrangement.
Figure 2:
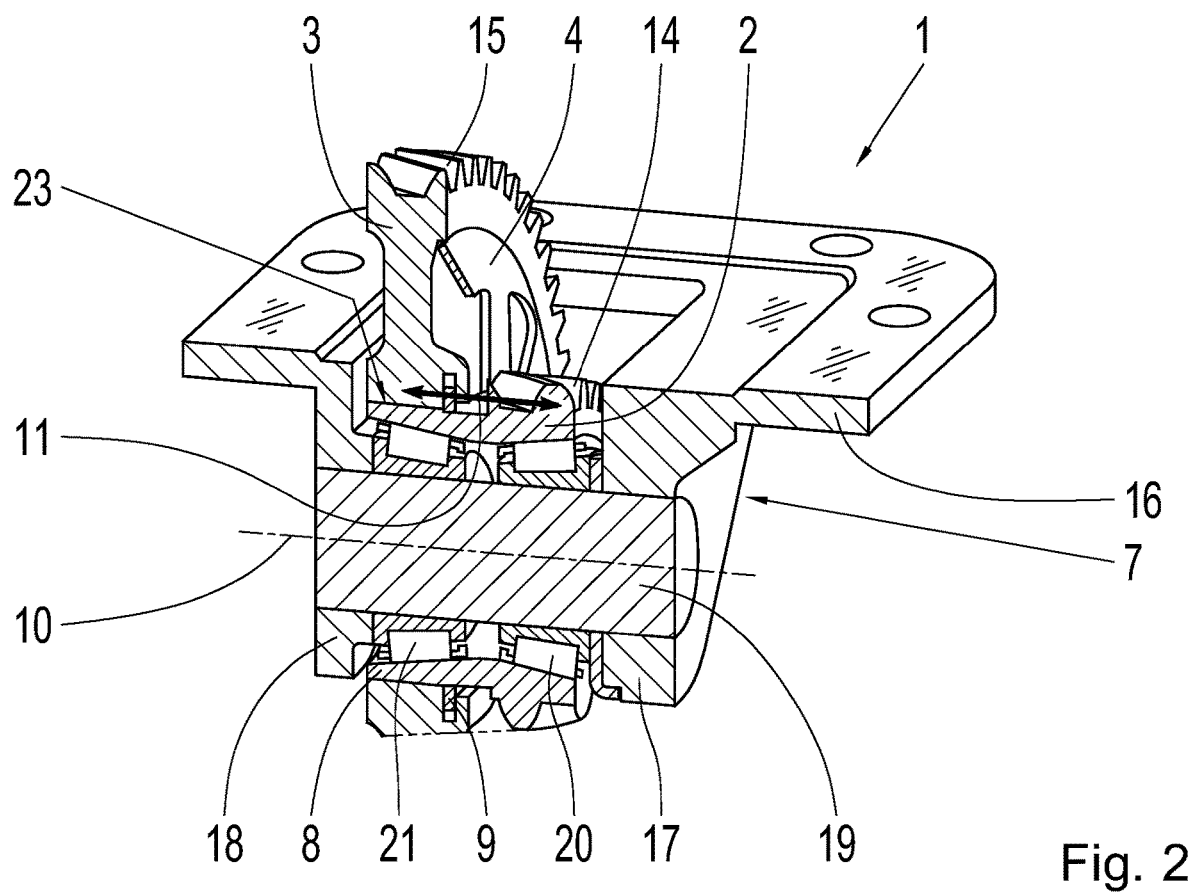
FIG. 2: A gearwheel arrangement for the quieter transmission of a mechanical rotary power, comprising a base, a shaft, two intermediate gearwheels, a spring device and a securing element, shown in an axonometric sectioned view.
Figure 3:
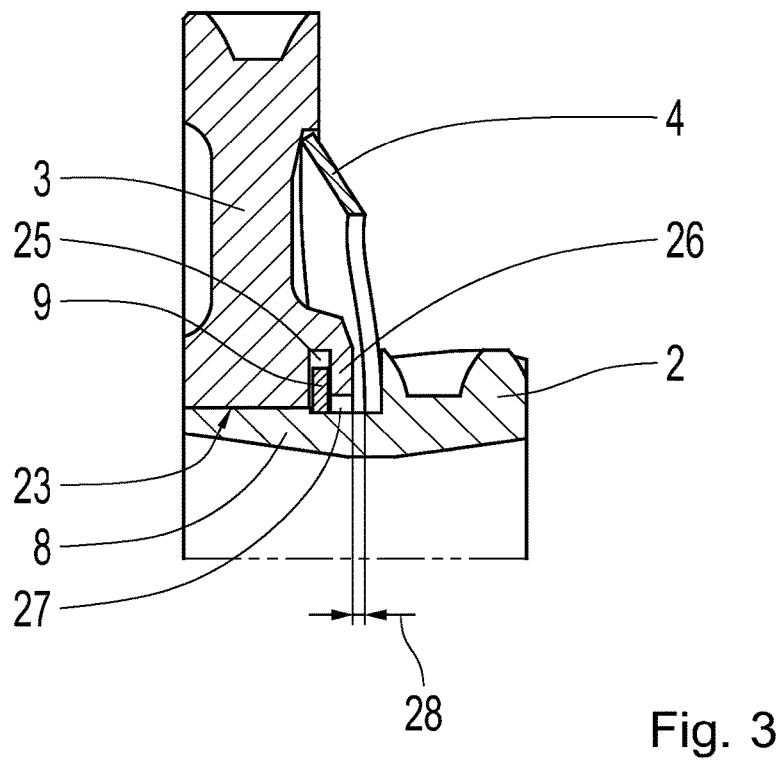
FIG. 3: A detailed view of a spring device and a securing element of a gearwheel arrangement for the quieter transmission of a mechanical rotary power, the arrangement comprising a shaft and two intermediate gearwheels.
Figure 4:
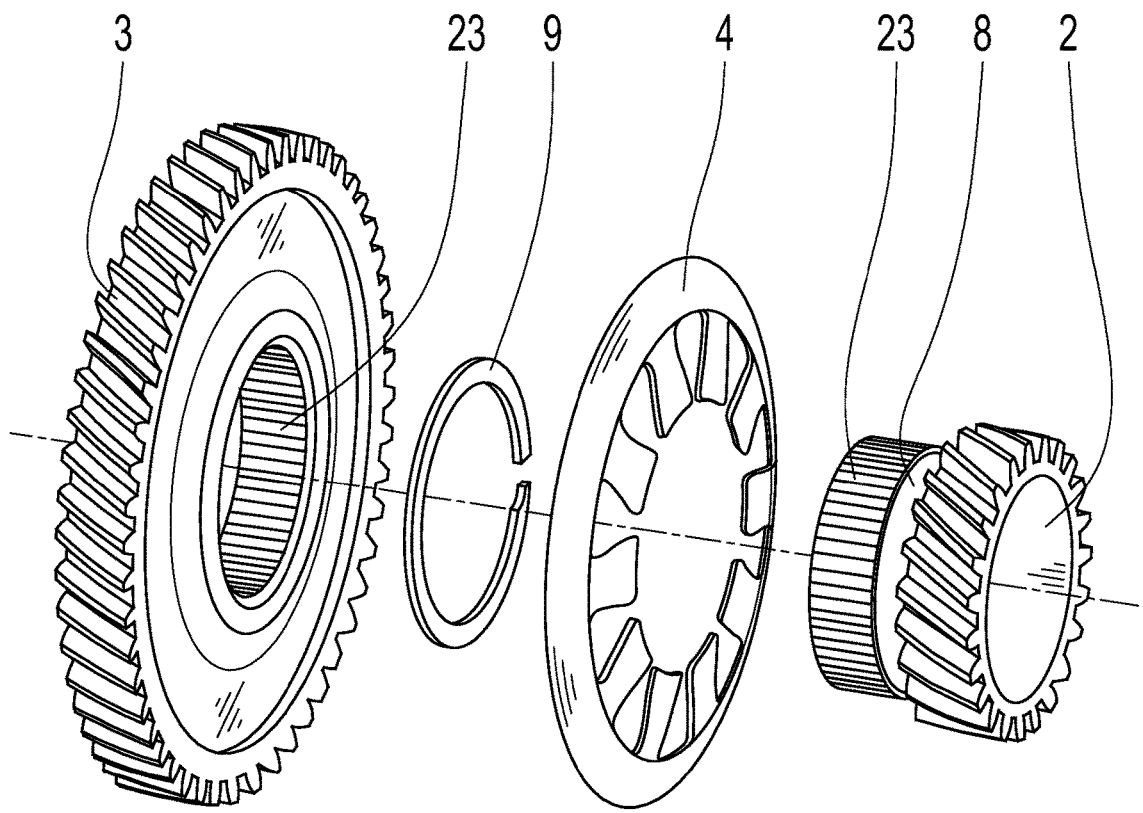
FIG. 4: An exploded view of a gearwheel arrangement for the quieter transmission of a mechanical rotary power, the arrangement comprising a shaft, two intermediate gearwheels, a spring device and a securing element.

FIG. 1 shows a gearwheel arrangement 1 for the quieter transmission of a mechanical rotary power, the arrangement comprising two intermediate gearwheels 2, 3 and a spring device 4, and two gearwheel pairs 5, 6 formed with the help of the gearwheel arrangement 1. FIG. 2 shows an axonometric sectioned view of an embodiment of the gearwheel arrangement 1 with a base 7, a shaft 8, the two intermediate gearwheels 2, 3, the spring device 4, and a securing element 9. FIG. 3 shows a detailed view of the spring device 4 and the securing element 9 of the embodiment of the gearwheel arrangement 1 with the shaft 8 and the two intermediate gearwheels 2, 3. FIG. 4 shows an exploded view of the embodiment of the gearwheel arrangement 1, with the shaft 8, the two intermediate gearwheels 2, 3, the spring device 4, and the securing element 9.

The intermediate gearwheels 2, 3 can rotate together about a common rotation axis 10 and can be displaced relative to one another to a limited extent, axially in the direction 11 shown by an arrow. The spring device 4 acts between the intermediate gearwheels 2, 3 and presses the intermediate gearwheels 2, 3 in the direction 11 of the arrow relative to one another with a spring force. The first intermediate gearwheel 2 forms the first gearwheel pair 5 with an input gearwheel 12 of an auxiliary power take-off module (not shown in any more detail). The second intermediate gearwheel 3 forms the second gearwheel pair 6 with an auxiliary output gearwheel 13 of a vehicle transmission (not shown in any more detail). The intermediate gearwheels 2, 3 are arranged parallel to one another and a distance apart. The first intermediate gearwheel 2 has a smaller number of teeth and a smaller diameter than the second intermediate gearwheel 3. The intermediate gearwheels 2, 3 have in each case slightly inclined conical teeth 14, 15 respectively. The teeth of the first intermediate gearwheel 2 are arranged with their tooth axes slightly inclined relative to the rotation axis 10 in such manner that the tooth axes and the rotation axis 10 intersect on a side facing away from the second intermediate gearwheel 3. The teeth of the second intermediate gearwheel 3 are arranged with their tooth axes inclined relative to the rotation axis 10 in such manner that the tooth axes and the rotation axis 10 intersect on a side facing away from the first intermediate gearwheel 2. The input gearwheel 12 of the auxiliary drive output module has teeth that correspond with those of the first intermediate gearwheel 2 of the gearwheel arrangement 1. The auxiliary output gearwheel 13 of the vehicle transmission has teeth that correspond with those of the second intermediate gearwheel 3 of the gearwheel arrangement 1.

The base 7 is designed as a support and has a plate section 16, two supporting sections 17, 18, and an axis 19. The first intermediate gearwheel 2 and the shaft 8 are made rotationally and axially fixed to one another by forming them in one piece. The shaft 8 is in the form of a hollow shaft and is mounted to rotate on the axis 19 by means of two conical roller bearings 20, 21. Thus the first intermediate gearwheel 2, together with the shaft 8, is arranged fixed but rotatable relative to the base 7.

The second intermediate gearwheel 3 is connected rotationally fixed but axially displaceable with the shaft 8, by means of a shaft-hub connection. The securing element 9 acts between the shaft 8 and the second intermediate gearwheel 3 and is in the form of a locking ring. For assembly and dismantling, the locking ring can be removed. To receive the locking ring, the second intermediate gearwheel 3 has a receiving groove 25, whose width corresponds at least approximately to that of the locking ring and which is limited axially by a holding section 26. The shaft 8 has a receiving groove 27 for the locking ring.

The spring device 4 acts between the first intermediate gearwheel 2 and the second intermediate gearwheel 3, pushes the intermediate gearwheels 2, 3 relative to one another with a spring force, and is in the form of a cup spring. The cup spring has a radially inner edge with which it rests against the first intermediate gearwheel 2 and a radially outer edge with which it rests against the second intermediate gearwheel 3. The radially inner edge is arranged in the receiving groove 27 of the shaft 8. The receiving groove 27 has a width which is greater than the sum of the width of the locking ring, the width of the holding section 26 and the width of the cup spring, so that for the second intermediate gearwheel 3 there is an axial displacement range 28 which is delimited by interlock.

The expression "can" indicates in particular that there are optional features of the invention. Consequently, there are further developments and/or example embodiments of the invention which have the feature or features concerned additionally or alternatively.

From the combinations of features disclosed herein, if necessary isolated features can also be singled out and, while resolving any sometimes existing structural and/or functional relationship between the features in combination with other features, can be used to demarcate the object of the claims.

INDEXES

1 Gearwheel arrangement
2 First intermediate gearwheel
3 Second intermediate gearwheel
4 Spring device
5 First gearwheel pair
6 Second gearwheel pair
7 Base 8 Shaft
9 Securing element
10 Rotation axis
11 Arrow direction
12 Input gearwheel
13 Auxiliary output gearwheel
14 Teeth
15 Teeth
16 Plate section
17 Supporting section
18 Supporting section
19 Axis
20 Conical roller bearing
21 Conical roller bearing
23 Shaft-hub connection
25 Receiving groove
26 Holding section
27 Receiving groove
28 Displacement range

The invention claimed is:

1. A gearwheel arrangement for transmitting a mechanical rotary power, the gearwheel arrangement comprising:
a first intermediate gearwheel; and
a second intermediate gearwheel, wherein the first intermediate gearwheel and the second intermediate gearwheel are rotatable together about a common rotation axis;
wherein at least one of the first and the second intermediate gearwheels has helical teeth, the first and the second intermediate gearwheels are axially displaceable relative to one another to a limited extent, and at least one of the first and the second intermediate gearwheels is acted upon by an axial spring force;
a securing element is located axially between the first and the second intermediate gearwheels, the securing element limiting axial displacement of the first and the second intermediate gearwheels relative to one another; and
a spring device that acts between the first and the second intermediate gearwheels, the spring device biases the securing element and the second intermediate gearwheel in an axial direction away from the first intermediate gearwheel.

2. The gearwheel arrangement according to claim 1, wherein the first and the second intermediate gearwheels are acted upon relative to one another by the axial spring force.

3. The gearwheel arrangement according to claim 1, wherein the gearwheel arrangement comprises a shaft, the first intermediate gearwheel is arranged on the shaft in an axially fixed position and the second intermediate gearwheel is arranged on the shaft and is axially displaceable to a limited extent.

4. The gearwheel arrangement according to claim 3, wherein the first intermediate gearwheel and the shaft are connected to one another as one piece.

5. The gearwheel arrangement according to claim 3, wherein the second intermediate gearwheel and the shaft are connected to one another by way of an axially displaceable shaft-hub connection.

6. The gearwheel arrangement according to claim 5, wherein axial displacement of the shaft-hub connection is restricted by positive interlock and/or is releasable.

7. An auxiliary power take-off module for a vehicle transmission, the auxiliary power take-off module comprising an input gearwheel, wherein the auxiliary power take-off module comprises a gearwheel arrangement according to claim 1.

8. The auxiliary power take-off module according to claim 7, wherein the input gearwheel is paired with the first intermediate gearwheel.

9. A vehicle transmission with an auxiliary output gearwheel and an auxiliary power take-off module, wherein the auxiliary power take-off module comprises a gearwheel arrangement according to claim 1.

10. The vehicle transmission according to claim 9, wherein the auxiliary output gearwheel is paired with the second intermediate gearwheel.

11. A gearwheel arrangement for transmitting a mechanical rotary power, the gearwheel arrangement comprising:
a first intermediate gearwheel; and
a second intermediate gearwheel, wherein the first intermediate gearwheel and the second intermediate gearwheel are rotatable together about a common rotation axis;
wherein at least one of the first and the second intermediate gearwheels has helical teeth, the first and the second intermediate gearwheels are axially displaceable relative to one another to a limited extent, and at least one of the first and the second intermediate gearwheels is acted upon by an axial spring force;
a securing element is located axially between the first and the second intermediate gearwheels, the securing element limiting axial displacement of the first and the second intermediate gearwheels relative to one another; and
the securing element is a locking ring, and each of the first and the second intermediate gearwheels has a receiving groove, and an outer edge of the locking ring is received within the receiving groove of the second intermediate gearwheel and an inner edge of the locking ring is received within the receiving groove of the first intermediate gearwheel.

12. The gearwheel arrangement according to claim 11, wherein a width of the receiving groove of the second intermediate gearwheel corresponds to a width of the locking ring such that the locking ring and the second intermediate gearwheel are axially displaceable relative to the first intermediate gearwheel.

13. The gearwheel arrangement according to claim 12, wherein the width of the receiving groove of the first intermediate gearwheel is greater than the width of the locking ring such that axial displacement of the second intermediate gearwheel is delimited.

14. The gearwheel arrangement according to claim 12, wherein the width of the receiving groove of the first intermediate gearwheel is greater than a sum of the width of the locking ring and width of a holding section of the second intermediate gearwheel and a width of a spring which applies the axial spring force on the at least one of the first and the second intermediate gearwheels.

* * * * *